(12) United States Patent
Kapila

(10) Patent No.: US 11,219,842 B2
(45) Date of Patent: Jan. 11, 2022

(54) THERMAL DESORPTION OF OILY SOLIDS

(71) Applicant: Halliburton Energy Services, Inc., Houston, TX (US)

(72) Inventor: Mukesh Kapila, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/741,093

(22) Filed: Jan. 13, 2020

(65) Prior Publication Data

US 2020/0368637 A1    Nov. 26, 2020

Related U.S. Application Data

(60) Provisional application No. 62/852,025, filed on May 23, 2019.

(51) Int. Cl.
| | |
|---|---|
| *C10B 47/44* | (2006.01) |
| *C10B 53/00* | (2006.01) |
| *B01D 5/00* | (2006.01) |
| *B01D 3/02* | (2006.01) |
| *B01D 1/00* | (2006.01) |
| *B01D 3/10* | (2006.01) |

(52) U.S. Cl.
CPC ........... *B01D 5/006* (2013.01); *B01D 1/0064* (2013.01); *B01D 3/02* (2013.01); *B01D 3/10* (2013.01); *B01D 5/0069* (2013.01); *C10B 47/44* (2013.01); *C10B 53/00* (2013.01)

(58) Field of Classification Search
CPC .......... B01D 3/10; B01D 3/101; B01D 3/105; B01D 5/0027; E21B 21/065; E21B 21/066; E21B 21/067; E21B 41/005; E21B 41/0057; C10B 53/06; C10B 53/07; C10B 47/44; C10G 1/02; F28B 3/04
See application file for complete search history.

(56) References Cited

U.S. PATENT DOCUMENTS

| | | | | |
|---|---|---|---|---|
| 2,701,681 | A | * | 2/1955 | Murray ..................... F28B 3/04 400/556.2 |
| 3,975,171 | A | * | 8/1976 | Burnham, Sr. .... B01D 19/0052 95/266 |
| 4,208,285 | A | | 6/1980 | Sample, Jr. |

(Continued)

FOREIGN PATENT DOCUMENTS

WO    03/062591 A1    7/2003

OTHER PUBLICATIONS

International Search Report and Written Opinion issued in related PCT Application No. PCT/US2019/013619 dated May 25, 2020, 13 pages.

*Primary Examiner* — Jonathan Luke Pilcher
(74) *Attorney, Agent, or Firm* — Tenley Krueger; Baker Botts L.L.P.

(57) ABSTRACT

Methods and systems involving thermal desorption of an oily slurry are provided. In some embodiments, such systems include a desorption vessel including an inner chamber; a heating unit disposed adjacent to the desorption vessel configured to heat a slurry including solids and oil disposed in the inner chamber of the desorption vessel; and a plurality of vapor outlets in fluid communication with the inner chamber of the desorption vessel, wherein each vapor outlet is in fluid communication with a condenser or an eductor for condensing vapors generated by heating the slurry.

19 Claims, 10 Drawing Sheets

(56) References Cited

U.S. PATENT DOCUMENTS

| | | | | |
|---|---|---|---|---|
| 4,222,988 | A | * | 9/1980 | Barthel ................. F26B 5/04 |
| | | | | 422/309 |
| 4,387,514 | A | | 6/1983 | McCaskill, Jr. |
| 4,683,963 | A | | 8/1987 | Skinner |
| 4,913,771 | A | * | 4/1990 | McIntyre ............... B01D 3/10 |
| | | | | 137/895 |
| 4,983,278 | A | * | 1/1991 | Cha ...................... C10B 47/44 |
| | | | | 208/407 |
| 6,399,851 | B1 | | 6/2002 | Siddle |
| 7,207,399 | B2 | | 4/2007 | Duhe et al. |
| 7,281,593 | B2 | * | 10/2007 | Steiner ................. E21B 21/14 |
| | | | | 175/71 |
| 7,514,049 | B2 | | 4/2009 | Kapila et al. |
| 7,727,377 | B2 | * | 6/2010 | Pickier ................. C10B 53/07 |
| | | | | 208/49 |
| 2005/0218037 | A1 | * | 10/2005 | Pickier ................. C10B 47/44 |
| | | | | 208/49 |
| 2006/0124300 | A1 | * | 6/2006 | Steiner ................. E21B 21/14 |
| | | | | 166/267 |
| 2015/0184098 | A1 | * | 7/2015 | Talwar ................. C10B 47/44 |
| | | | | 44/307 |
| 2017/0056785 | A1 | * | 3/2017 | Popov ................... B01D 3/007 |

* cited by examiner

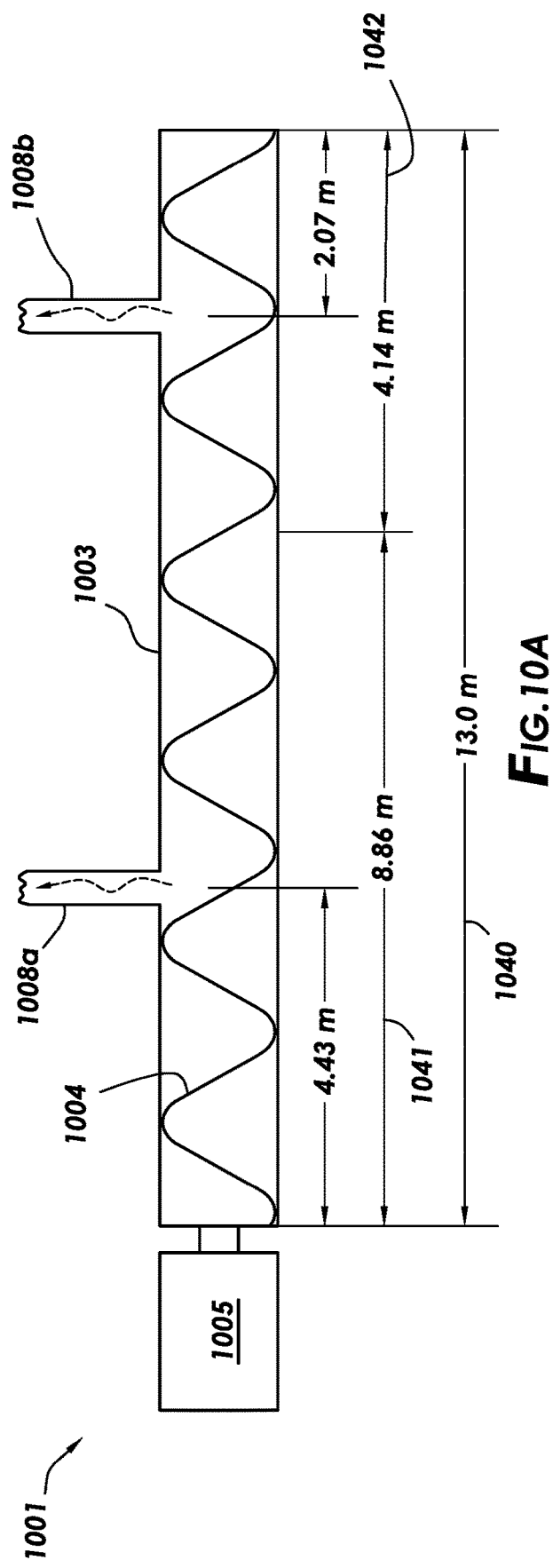
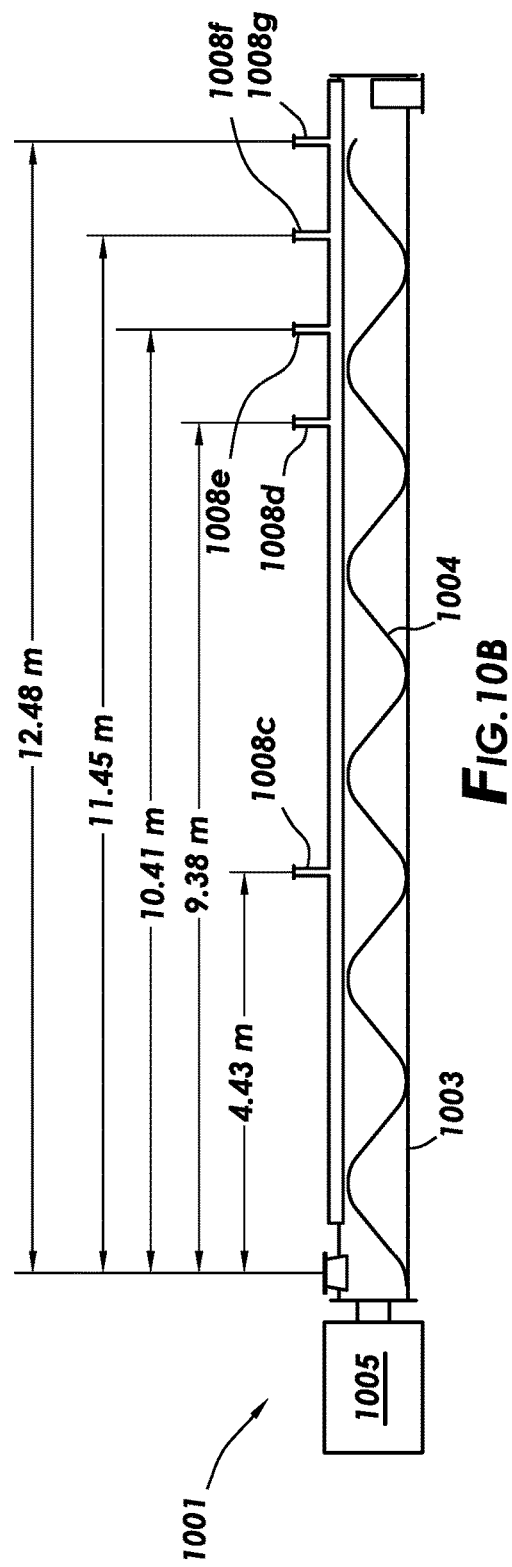
FIG.10A
FIG.10B

THERMAL DESORPTION OF OILY SOLIDS

CROSS-REFERENCE TO RELATED APPLICATION

The present application claims the benefit of U.S. Provisional Application No. 62/852,025 filed May 23, 2019, which is incorporated herein by reference in its entirety for all purposes.

BACKGROUND

The present disclosure relates to methods and systems involving separation of liquids and solids.

Treatment fluids are used in a variety of operations that may be performed in subterranean formations. As referred to herein, the term "treatment fluid" will be understood to mean any fluid that may be used in a subterranean application in conjunction with a desired function and/or for a desired purpose. The term "treatment fluid" does not imply any particular action by the fluid. Treatment fluids often are used in, e.g., well drilling, completion, and stimulation operations. Examples of such treatment fluids include, among others, drilling fluids, well cleanup fluids, workover fluids, conformance fluids, gravel pack fluids, acidizing fluids, fracturing fluids, spacer fluids, and the like.

Treatment fluids are used in well drilling, a process used in penetrating formations that produce oil and gas. In drilling, a wellbore is drilled while a drilling fluid (also known as a drilling mud) is circulated through the well bore. After drilling the wellbore to a desired depth, a string of pipe, e.g., casing, may be run in the wellbore. The drilling fluid in the wellbore may be conditioned by circulating the fluid downwardly through the interior of the pipe and upwardly through the annulus between the exterior of the pipe and the walls of the well bore.

During the drilling process, the drill bit generates drill cuttings (e.g., rocks, sand, shale grit) as it forms the well bore. The drill cuttings may become suspended or mixed in the drilling fluid and carried in a return flow stream of the drilling fluid back to the well drilling platform. The drill cuttings may then be separated from the bulk of the drilling fluid via a separation process to generate an oily drill cutting slurry. After removing the drill cuttings therefrom, one or more components of the drilling fluid may be re-used in other treatment operations.

Various methods for removing hydrocarbons, water, and/or contaminants from drill cuttings have been employed. In some cases, indirect heat thermal desorption is applied to oily water solids such as drill cuttings. respectively. In such a process, the temperature of slurry may increase to generate sufficient vapor pressure to separate oil and/or water from the solids (which may be inert), generating vapors that are separated from the solids. In certain thermal desorption methods, a cooled liquid is used to quench and condense the vapors. Different vessels in series with various cooling fluid temperatures may be used in these methods to preferentially condense high end boiling point carbon chains hydrocarbons along with steam.

However, these configurations of thermal desorption may allow the comingling of low boiling point vapors (e.g., water or lower boiling point hydrocarbons) and high boiling point vapors (e.g., higher boiling point hydrocarbons) prior to condensation. In such cases, the high boiling point vapors may need to be heated beyond the boiling point required for volatilization to prevent vapors from high boiling vapors from prematurely condensing when they are mixed with the lower boiling point vapors. Depending upon the placement of the vapors outlet points, either the low boiling point vapors will need to be further heated or the high boiling point vapors will need to be further heated to prevent premature condensing in the desorption chamber. In certain cases, the vapors are removed at a single point, typically near the inlet or the middle of the desorption vessel, resulting in overheating the higher boiling point hydrocarbons.

Heating beyond the boiling point of each component of the liquid of the slurry may be less efficient and may require superheating the water vapor (steam), requiring additional energy. Additionally, higher vapor temperatures may lead to cracking of the hydrocarbon vapors into lower carbon chain hydrocarbons, which may cause breakdown or destruction of drilling fluid additives (e.g., emulsifiers, wetting agents, etc.). This may also lead to the generation of foul and low odor threshold compounds such as aldehydes, ketones and Sulphur-based compounds. In addition, benzene, toluene, ethylbenzene and xylene (BTEX compounds) may be generated along with non-condensable gases.

In certain processes, the vapors are removed from the desorption vessel by negative pressure applied by a blower downstream of the condensing vessel. However, because blowers may be damaged by liquid or solid mist or slugs of fluid, such a configuration may require equipment such as knock out vessels, filters and demisters before and after the blower, raising energy requirements and cost.

BRIEF DESCRIPTION OF THE DRAWINGS

These drawings illustrate certain aspects of some of the embodiments of the present disclosure and should not be used to limit or define the claims.

FIGS. 10A-C are schematic diagrams of vapor outlets for a thermal desorption system in accordance with certain embodiments of the present disclosure.

Figure 1:
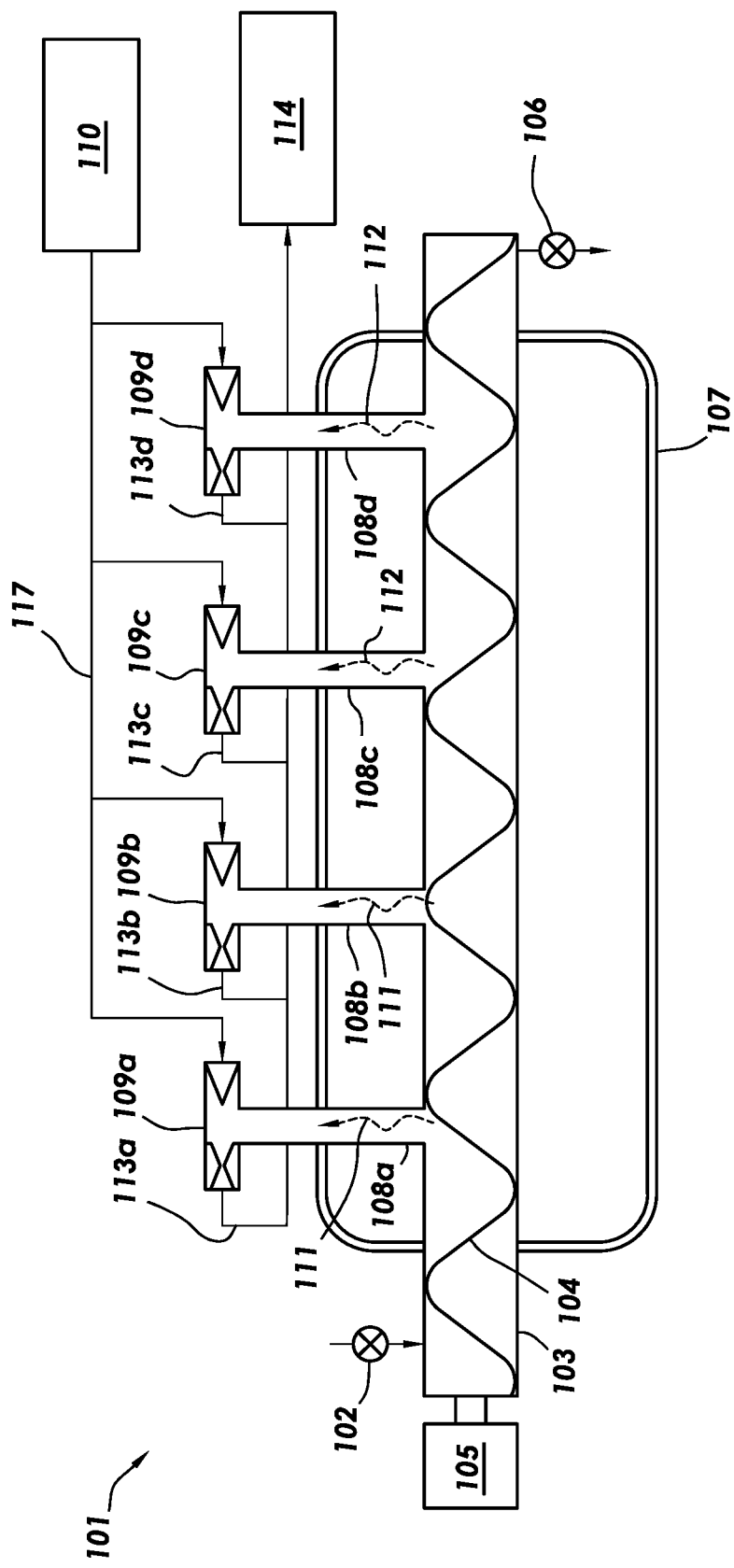
FIG. 1 is a schematic diagram of a thermal desorption system in accordance with certain embodiments of the present disclosure.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming, but would nevertheless be a routine undertaking for those of ordinary skill in the art having the benefit of the present disclosure.

The present disclosure relates to methods and systems involving separation of liquids and solids. Specifically, in certain embodiments, the present disclosure relates to thermal desorption of an oily slurry.

In certain embodiments, the systems of the present disclosure may include a desorption vessel including an inner chamber; a heating unit disposed adjacent to the desorption vessel configured to heat a slurry including solids and oil disposed in the inner chamber of the desorption vessel; and a plurality of vapor outlets in fluid communication with the inner chamber of the desorption vessel, wherein each vapor outlet is in fluid communication with a condenser or an eductor for condensing vapors generated by heating the slurry. In some embodiments, the methods of the present disclosure may include heating a slurry including oil and solids in a desorption vessel to convert at least a portion of the oil in the slurry to oil vapor; removing at least a first portion of the oil vapor from the desorption vessel at a first oil vapor outlet; and removing at least a second portion of the oil vapor from the desorption vessel at a second oil vapor outlet.

In certain embodiments, the systems of the present disclosure may include a desorption vessel including an inner chamber; a heating unit surrounding the desorption vessel and configured to heat a slurry including solids and oil disposed in the inner chamber of the desorption vessel; a plurality of vapor outlets in fluid communication with the inner chamber of the desorption vessel; and a plurality of eductors configured to condense vapors from the plurality of vapor outlets, wherein each vapor outlet is coupled to an eductor.

In certain embodiments, the system and methods of the present disclosure may convert a substantially continuous feed of a slurry including oil and solids (e.g., drill cuttings) into substantially oil-free solids and vapor by heating the slurry in a desorption vessel. In some embodiments, the slurry may also include water and/or other liquid components. The vapors separated from the slurry may exit the vessel at a plurality of vapor outlets disposed along the length of the desorption vessel. The desorption vessel may be operated under negative pressure. The negative pressure may facilitate the removal the vapors as they are generated and increase desorption of liquids from the solids in the slurry.

Among the many potential advantages to the methods, apparatus, and systems of the present disclosure, only some of which are alluded to herein, the present disclosure may provide improved thermal desorption of oily solids at a relatively low energy requirement. In certain embodiments, the systems and methods of the present disclosure substantially eliminates the comingling of vapors, providing several benefits. For example, substantially eliminating comingling may avoid the need to superheat steam to prevent premature condensing of hydrocarbon vapors. In certain embodiments, the specific energy needed to desorb the liquid fractions of oily solids is lower when the vapors are not comingled prior to condensation. Additionally, since the heat transfer surface area and overall heat transfer is fixed, a lower energy requirement results in an increased feed rate. Also, when the energy to superheat steam is no longer required, the cooling requirements for condensing the vapors is also reduced, reducing equipment and energy requirements. The methods and systems of the present disclosure may, in certain embodiments, remove the need for a blower as well as knock out vessels and demisters to remove vapors upstream of the blower. In certain embodiments, removing blowers, knock out vessels, and demisters may reduce upset conditions, reduce equipment, reduce the need for managing collected fluids, and reduce equipment footprint.

The use of eductors in one or more embodiments of the present disclosure may provide improved methods and systems for indirect thermal desorption of oily solids that avoid comingling of vapors. In certain embodiments, without wishing to be limited by theory, an eductor operates by generating suction due to the venturi effect by using a motive fluid passing through a narrowed or tapered pipe in the eductor, increasing the pressure of the motive fluid as it enters the eductor and thereby applying suction to an opening or other pipe or hose attached to the eductor. The use of eductors may allow the use of significantly smaller vessels compared to typical quench vapor condensing vessels. Additionally, eductors may be more tolerant of solids in the cooling fluid than typical vessels, reducing problems with frequently plugged nozzles. For example, eductors may include openings of 20 mm or more compared to typical nozzles which have openings of 2 mm or less. In some embodiments, eductors may be lower cost and adaptable to attach to hard piping or hose. Attaching eductors to hose, for example, may be useful when vapors are removed from a desorption vessel that expands due to thermal expansion eliminating the need for bellows expansion joint.

In some embodiments of the present disclosure, the use of eductors may reduce hydrocarbon cracking by eliminating or reducing the overheating of hydrocarbon vapors when comingled with lower temperature steam to prevent premature condensing. In certain embodiments, the use of eductors and multiple vapor outlet points may reduce the distance the hydrocarbons must travel before condensing. This shorter residence time may result in less cracking of hydrocarbons.

In certain embodiments, a system of the present disclosure may include a desorption vessel including a plurality of vapor outlets and a heating unit disposed adjacent to or surrounding the desorption vessel. The heating unit may, in certain embodiments, be configured to heat, directly or indirectly, a slurry including solids and oil disposed in an inner chamber of the desorption vessel. In some embodiments, each vapor outlet is in fluid communication with a condenser or an eductor for condensing vapors generated by heating the slurry. In certain embodiments, an eductor may be coupled to each vapor outlet. The desorption vessel may include a conveyor system (e.g., a conveyor belt, auger, or the like) to convey a substantially continuous slurry feed through the desorption vessel. In some embodiments, condensed vapors from the eductors or condensers may flow into a degasser unit that may allow for the release of at least a portion of gases (e.g., non-condensable gases) present in the condensed vapors. An oil/water separator may be fluidically coupled to the degasser unit and configured to substantially separate the degassed condensed vapors into a substantially oil-based fluid and a substantially aqueous fluid. In some embodiments, the degasser unit may be omitted from the system and the condensed vapors may flow directly to the oil/water separator.

FIGS. 1-10 depict certain embodiments of the systems and methods of the present disclosure. As shown in FIG. 1, a thermal desorption system 101 may include a feed of a slurry 102 into a desorption vessel 103. The desorption vessel 103 may be a fixed horizontal steel tube with an conveyor system 104 that moves feed material through the length of the tube. The slurry may include, but is not limited to oil (e.g., hydrocarbons), solids, an aqueous fluid (e.g., water, saltwater, brine), and any combination thereof. In certain embodiments, the slurry may also include other drilling fluid additive and/or contaminants from formations fluids. In certain embodiments, the solids in the slurry may include, but are not limited to drill cuttings, formation materials, treatment fluid additives, or any other wellbore materials. In certain embodiments, the slurry may include 40% or less, 30% or less, or 20% or less oil by weight of the slurry. In some embodiments, the slurry may include between from about 5% to about 40% oil by weight of the slurry. In certain embodiments, the slurry may include 30% or less, 15% or less, or 5% or less water by weight of the slurry. In some embodiments, the slurry may include between from about 0.01% to about 30% water by weight of the slurry. In certain embodiments, the slurry may include an oil:water:solids ratio of 15:10:75 percent by weight. In certain embodiments, drilling cuttings may include a drilling fluid with liquid compounds having boiling points from about 100° C. to about 300° C.

The slurry is fed through the desorption vessel 103 by a conveyor system 104. The conveyor system 104 may include an auger, screw, or other component sufficient to convey the slurry along the length of the desorption vessel 103. The slurry traveling through the desorption vessel 103 is heated by heat supplied by the heating unit 107. In some embodiments, the desorption vessel 103 may be disposed within the heating unit 107 so that the heating unit 107 surrounds the desorption vessel 103. In some embodiments, the slurry in the desorption vessel is indirectly heated by the heating unit 107 through the walls of the desorption vessel 103. In certain embodiments, as shown in more detail in FIGS. 7 and 8, the heating unit 107 may be a combustion system including a firebox and burners. In certain embodiments, the heating unit 107 may be a combustion system that runs on fuel. In some embodiments, at least a portion of the fuel fed to the heating unit may include oil and/or non-condensable gas separated from the slurry. For example, in certain embodiments, at least a portion of the condensed oil vapor from the slurry is condensed and then fed to the heating unit to serve as fuel.

The heat from the heating unit 107 increases the temperature of the slurry in the desorption vessel 103 enough to generate sufficient vapor pressure to separate the liquids of the slurry from the solids, generating vapor. The temperature of the slurry increases as it advances along the length of the desorption vessel 103 from the feed inlet 102 to the solids outlet 106. As the temperature of the slurry increases, liquid components in the slurry are volatilized, generating vapors 111, 112. The desorption vessel 103 may include a plurality of vapor outlets 108a-d. Although depicted as having four vapor outlets 108a-d in FIG. 1, in certain embodiments, a desorption vessel 103 of the present disclosure may include from 2 to 20 vapor outlets. In some embodiments, (e.g., if the slurry includes water and one hydrocarbon type (single boiling point)), only two vapor outlets may be required. In certain embodiments, for example, if the feed material contains water and a mixture of hydrocarbons with multiple boiling points, then a separate vapor outlet for water and each hydrocarbon may be required. The position of each vapor outlet 108a-d may be selected, based, at least in part, on the energy required to volatilize the liquid based on the temperature required to reach boiling point. Lower temperature vapors 111 are generated first as the temperature of the slurry increases, and exit the desorption vessel 103 at the vapor outlets 108a and 108b. In certain embodiments, lower temperature vapors 111 may primarily include vapors of liquid components of the slurry with relatively lower boiling points. For example, the lower temperature vapors 111 may include a significant portion of an aqueous phase of the slurry (e.g., water, seawater, brine). Additionally, lower temperatures vapors 111 may include lower molecular weight hydrocarbons including, but not limited to hexane, heptane, octane, and the like. The higher temperature vapors 112, for example, may primarily include liquid components of the slurry with higher boiling points, including, but not limited to fuel oil, lubricating oil, bitumen, a high molecular weight hydrocarbon, and any combination thereof. In some embodiments, the vapor outlets 108a-d may be positioned such that the vapors 111 exiting the first vapor outlet 108a are primarily aqueous vapor, the vapors 111 exiting the second vapor outlet 108b are primarily low molecular weight hydrocarbons, and the vapors 112 exiting the other vapor outlets 108c, d are higher molecular weight hydrocarbons. In some embodiments, the desorption process may also generate one or more non-condensable gases. These non-condensable gases along with any ambient air in the desorption vessel may also exit through the vapor outlets 108a-d.

In some embodiments, the desorption vessel 103 and the vapor outlets 108a-d may be operated at a negative pressure. In certain embodiments, the desorption vessel 103 may be operated at a slight negative pressure (e.g., less than 1 inch of mercury). In certain embodiments, operating the desorption vessel 103 and the vapor outlets 108a-d at negative pressure may increase the volatilization of the liquids in the slurry and may remove the vapors through the closest vapor outlet 108a-d. In certain embodiments, negative pressure may be applied, for example, by a blower downstream of the vapor outlets. As depicted in FIG. 1, negative pressure is applied to the vapor outlets 108a-d and the desorption vessel 103 by a series of eductors 109a-d fluidically coupled to the vapor outlets 108a-d. The vapor outlets 108a-d may be connected to the eductors 109a-d.

In certain embodiments, the vapors 111, 112 may be condensed in the eductors 109a-d using a motive fluid 117. In the embodiment of FIG. 1, the motive fluid 117 flows from a motive fluid header 110 and passes through the eductors 109a-d. The motive fluid flow may, in certain embodiments, apply a negative pressure to the vapor outlets 108a-d, removing the vapors 111, 112 generated in the desorption vessel 103. In some embodiments, the negative pressure and the motive fluid 117 flow may also condense the vapors 111, 112. In certain embodiments, the motive fluid may include water, an oil/water mixture, and oil/water/solid fines slurry, and any combination thereof.

In certain embodiments, the flow rate and pressure of the motive fluid 117 flowing through the eductors 109a-d may, in certain embodiments, be selected based, at least in part, on, at least one of the desired negative pressure and fully condensing the vapors 111, 112. In certain embodiments, the pressure of the motive fluid 117 may be set at a flow rate and a pressure sufficient to create a negative pressure in the desorption vessel 103 while substantially or completely condensing the vapors 111, 112. In some embodiments, the mass flow rate of the motive fluid is significantly higher than the mass flow rate of the vapors, and is sufficiently higher than the mass flow rate of the vapors that the vapors are completely condensed. In certain embodiments, motive fluid flow rate may be set around 10 times the flow rate by mass of the vapor in the vapor outlet 108a-d. In some embodiments, the pressure of the motive fluid may be from about 30 to about 80 psi, from about 20 to about 90 psi, or from about 10 to about 100 psi. In certain embodiments, the eductors 109a-d may evacuate all vapors flowing into them, including non-condensable gases and leakage air. In some embodiments, the non-condensable gases may be entrained in the liquid in the form of microbubbles and/or dissolved. In certain embodiments, these non-condensable gases may be liberated from the fluid over time.

The fluid exiting the eductors 113a-d may include the condensed vapors, motive fluid, and/or non-condensable gases. As depicted in FIG. 1, the fluid exiting each eductor 113a-d may be combined into a single stream 114 for further treatment and separation. Alternatively, in certain embodiments, the fluid exiting each eductor 113a-d could be treated separately, or some subset of the fluids could be treated together.

In certain embodiments, condensers (not shown) could be used in place or in addition to the eductors 109a-d to condense the vapors 111, 112. For example, the vapors 111, 112 may be condensed using spray condensers or any other suitable condenser.

After passing through the desorption process, the separated solids exit the desorption vessel 103 at the outlet 106. The separated solids may be discharged into a separate vessel or collection auger (not shown). In certain embodiments, the separated solids may include less than 1% oil by weight, or less than 1% liquid by weight.

Figure 2:
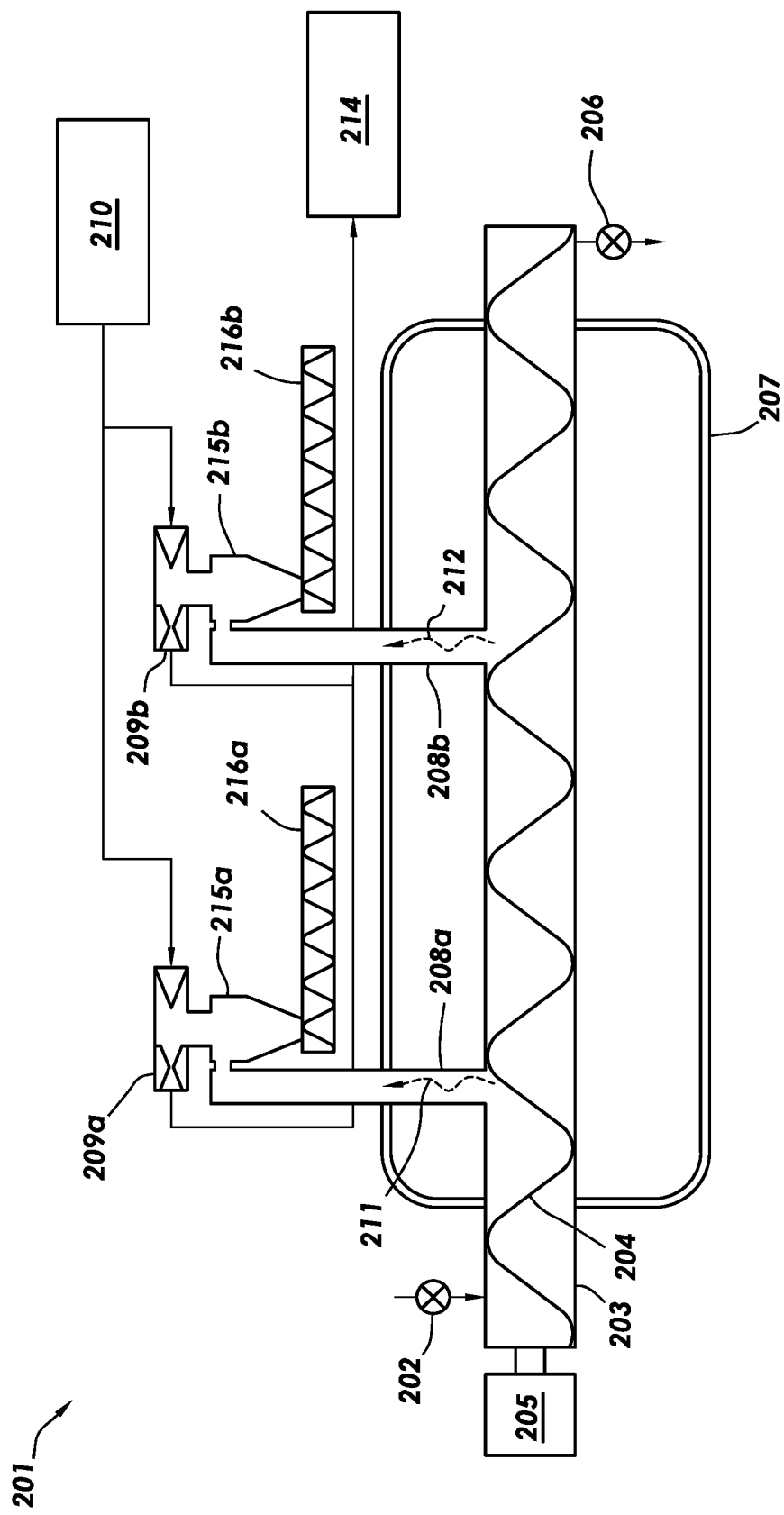
FIG. 2 is a schematic diagram of a thermal desorption system in accordance with certain embodiments of the present disclosure.

In some embodiments, the vapors volatilized by the increase in temperature may also include a mist (e.g., liquid droplets suspended in the vapors) and/or fine particles suspended in the vapors. As shown in FIG. 2, one or more cyclones 215a, 215b may be fluidically connected to one or more vapor outlets 208a, 208b so that the vapors 211, 212 pass through the cyclones 215a, 215b and the particle fines are removed. The particle fines settled out of the cyclones 215a, 215b may be removed by fine particles removal systems 216a, 216b.

In certain embodiments, the position of each vapor outlet 108a-d for the desorption vessel 103 may be selected, based, at least in part, on the energy required to volatilize one or more components of the liquid of the slurry. For example, the energy required to volatize each of the one or more compounds may be determined based on the temperature required to reach boiling point. For example, the vapor outlets for a hypothetical desorption vessel treating a slurry including a liquid including two components, Compound A and Compound B, may be selected by calculating the energy required to volatize Compound A and Compound B. If Compound A requires 30% of the energy transferred to the desorption vessel, then a first vapor outlet for Compound A may be positioned about 30% of the distance along the length of the desorption vessel. A second vapor outlet to remove Compound B vapors may be more than 30% and less than 100% of the distance along the length of the desorption vessel. Alternatively, if Compound B requires 70% of the energy transferred to the desorption vessel, the second vapor outlet may be positioned 70% of the distance along the length of the desorption vessel.

In certain embodiments, the vapor outlets of a desorption vessel may be calculated by dividing the length of the desorption vessel into two desorption zones: a water zone and a hydrocarbon zone. In some embodiments, the water desorption zone may include a first vapor outlet for water vapor and the hydrocarbon desorption zone may include one or more vapor outlets for hydrocarbons. For example, in certain embodiments, the hydrocarbon zone may have multiple vapor outlets distributed according to the weighted carbon chain distribution (or potentially distributed over that zone's distance). In certain embodiments, the carbon chain distribution of the hydrocarbons from a gas chromatograph may be a good indicator of boiling points and mass fraction, and the weighted distribution of the hydrocarbons may be used to determine location of the vapor outlets along the length of a desorption vessel.

Figure 3:
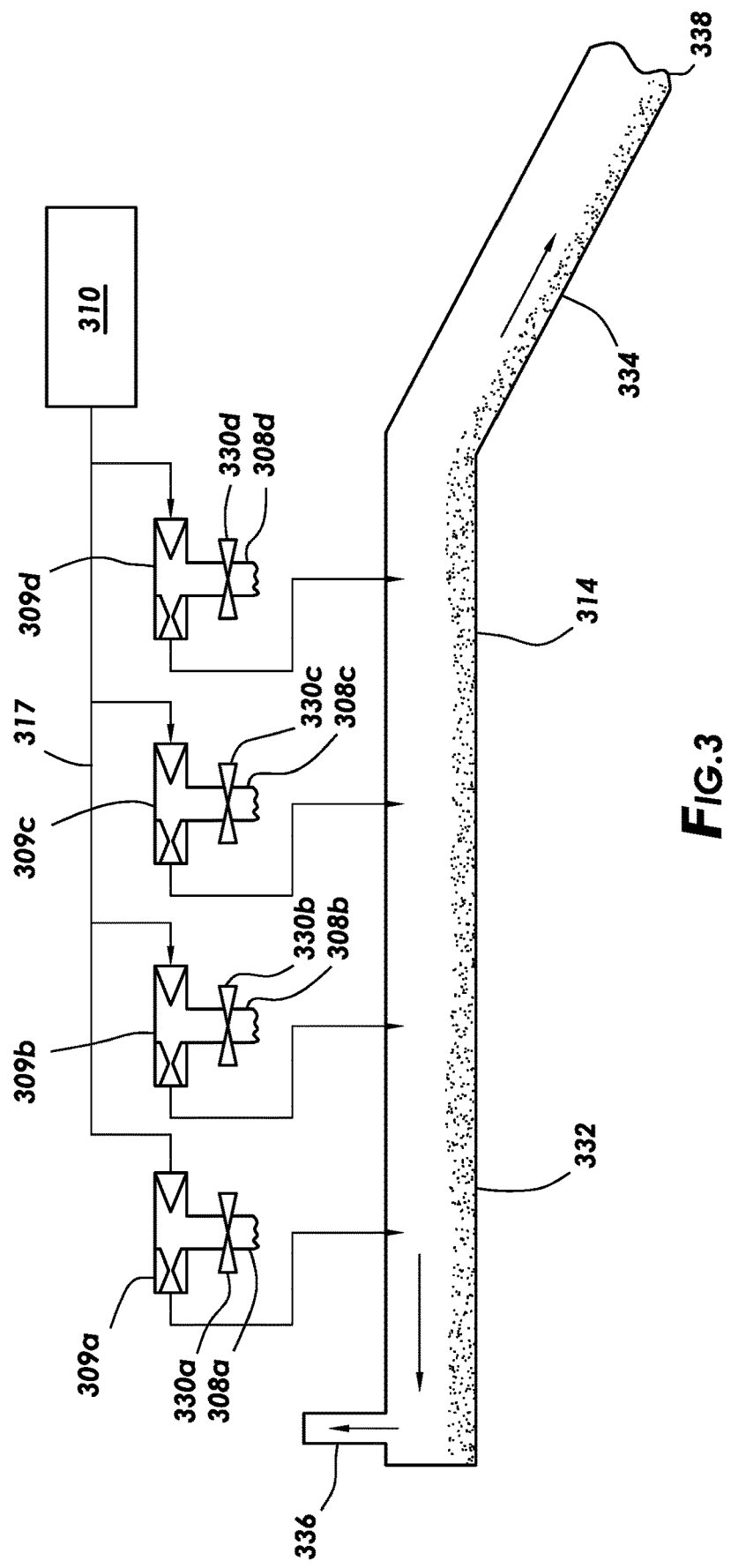
FIG. 3 is a schematic diagram of a thermal desorption system including multiple eductors in parallel and a condensed vapors and motive cooling fluid header according to certain embodiments of the present disclosure.

FIG. 3 depicts a diagram of a system including multiple eductors in parallel and a condensed vapors and motive cooling fluid header according to certain embodiments of the present disclosure. Motive fluid from a motive cooling fluid header 310 flows through a series of parallel eductors 309a-d fluidically coupled to vapor outlets 308a-d from a desorption vessel (not shown). Unlike the eductors 109a-d of FIG. 1, the motive fluid and condensed vapors exiting the eductors 309a-d flow separately into the condensed vapors and motive cooling fluid header 314. This configuration allows for the multiple eductors 309a-d placed in parallel to be independently turned on or off using valves 330a-d as required to adjust the vapor outlets of a vapor desorption vessel based on variable content of the liquid in a feed slurry.

In certain embodiments, a modular vapor desorption vessel may include a series of optional vapor outlets distributed along the length of the vessel. In certain embodiments, the optional vapor outlets may be plugged or closed by a valve when not in use, or connected to an eductor or other condenser when in use. The eductors of the modular vapor desorption vessel may be connected in series (as shown in FIG. 1) or in parallel (as shown in FIG. 3) to the condensed vapors and motive cooling fluid header.

The condensed vapors and motive cooling fluid header 314 may serve as a degasser and separator. In certain embodiments, the present disclosure includes a method of degassing the motive cooling fluid and the condensed vapors in a compact manner utilizing gravity flow that encompasses the existing pipe between the eductor horizontal header and an oil/water separator (referred to herein as the cascading degasser).

The motive fluid, condensed vapors, and any entrained non-condensable gases flow from the eductors 309a-d into the condensed vapors and motive cooling fluid header 314, where the liquid (e.g., condensed vapors and motive cooling fluid) are separated from the non-condensable gases. As depicted in FIG. 3, the condensed vapors and motive cooling fluid header 314 may include a substantially horizontal tube 332 and may connect to a cascading degasser 334. The fluids from the eductors 309a-d are introduced into the horizontal portion 332, where the liquids and non-condensable gases at least partially separate. The non-condensable gases exit the gas outlet 336 and the liquids in the header 314 cascade down the cascading degasser 334. In some embodiments, gases may separate from the liquid as it cascades down the cascading degasser 334 and may exit the gas outlet 336, providing further liquid/gas separation. The degassed liquid may exit at any liquid outlet 338 near the bottom of the cascading degasser 334. In some embodiments, the degassed liquid may flow to an oil/water separator (not shown) to separate the liquid into water and oil. In certain embodiments, the separated water may be fed back to the motive fluid header 310 for re-use as a motive cooling fluid. The separated oil may be used as fuel for the heating unit 307, disposed of, or re-used in another treatment fluid.

Figure 4A:
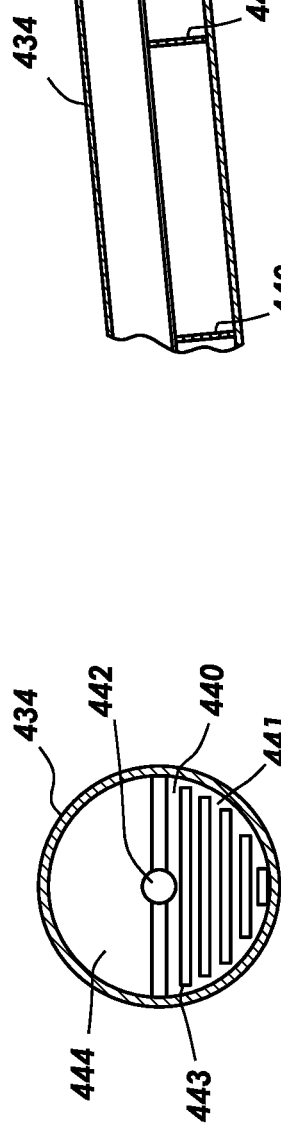
FIGS. 4A-D depict an equipment layout for a thermal desorption system including an insert for a cascading degasser according to certain embodiments of the present disclosure.
Figure 4B:
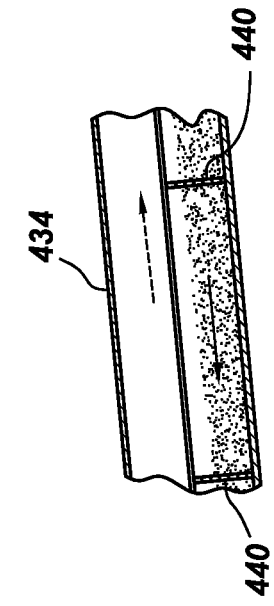
Figure 4C:
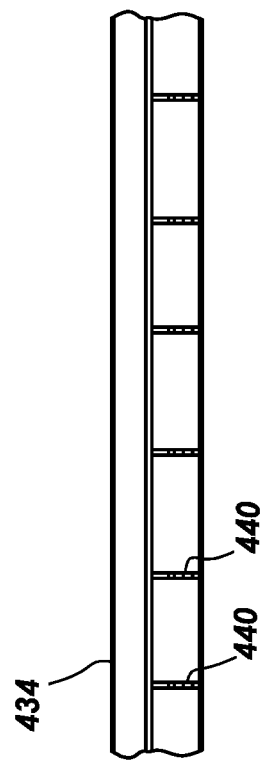
Figure 4D:
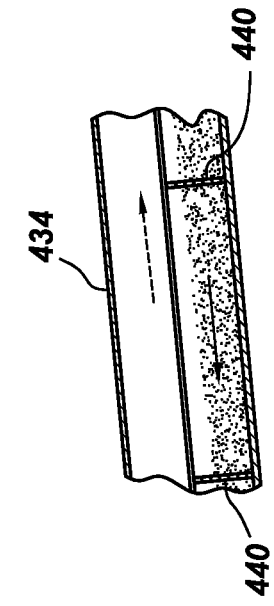

In certain embodiments, the cascading degasser 334 of the header 314 includes one or more degassing inserts that increases degassing of the liquid as it flows down in the cascading degasser 334. In some embodiments, without wishing to be limited by theory, a degassing insert may allow the fluid to cascade and spread over the surface, creating a thin film which promotes the degassing and coalescence of microbubbles. As shown in FIGS. 4A-D, degassing inserts 440 may be spaced apart along the length of the cascading degasser 434. A rod 442 may connect the inserts 440. The degassing inserts 440 may have a profile 441 including openings 443 to allow liquid to pass through and over the degassing insert 440 as it cascades down the cascading degasser 434. As shown in FIG. 4A, the degassing insert 440 may be a semicircular insert with a profile 441 including a plurality of rectangular openings. As depicted in FIG. 4C, the degassing insert 440 may be placed along the bottom of the degassing chamber. In some embodiments, the degassing insert 440 may fill 60% or less of the cross-sectional volume of the cascading degasser 434. The remaining cross-sectional volume 444 (e.g., the 40% or more not filled by the insert) may be headspace that provides a passageway for gases to flow to the exit at the top of the header (e.g., 614 of FIG. 8). In certain embodiments, should any mist form during the degassing process, the mist may be allowed to naturally coalesce on the interior upper un-wetted portion of the header 414 or simply settle into the free-flowing fluid by gravity. In certain embodiments, the diameter of the cascading degasser 434 is such that the flow of the degassed vapors is at least 0.5 msec. In some embodiments, the diameter of the cascading degasser 434 is selected to ensure that there is no retrainment of fluid in the gas stream in the headspace.

Figure 5:
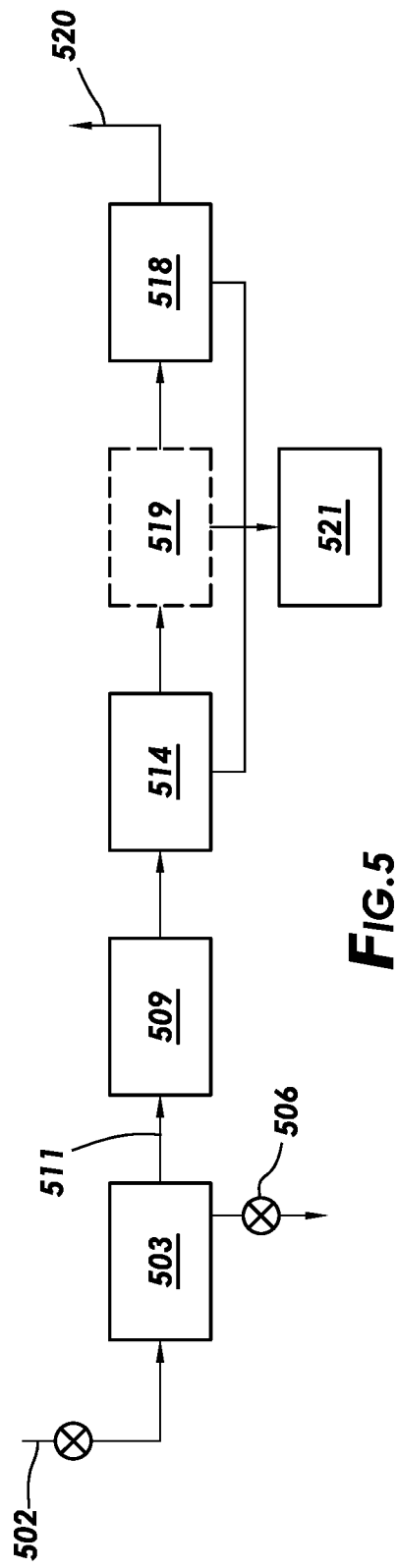
FIG. 5 is a schematic diagram of a thermal desorption process flow in accordance with certain embodiments of the present disclosure.

In certain embodiments, the use of eductors as described in the present disclosure may eliminate the need for a blower downstream of the desorption vessel. For example, FIG. 5 depicts a process flow including an eductor and no blowers according to certain embodiments of the present disclosure. The oily slurry 502 is treated in the desorption vessel 503 and separated into desorbed solids 506 and volatilized compounds 511, which may include, but is not limited to vapors (e.g., water vapor, oil vapor), mist, and non-condensable gases. One or more eductors 509 apply negative pressure to the desorption vessel 503 and condense the vapors generated in the desorption vessel 503. The mist and non-condensable gases generated in the desorption vessel 503 may be entrained and/or dissolved in the motive fluid of the one or more eductors 509. The combined fluids exiting the one or more eductors 509 may enter a condensed vapor and motive fluid header 514. Non-condensable gases separated in the condensed vapor and motive fluid header 514 may be passed through an oxidizer or filter 518 and optionally a knock out or demister vessel 519 prior to venting to the atmosphere or to a stack 520. Fluids from the condensed vapors and motive fluid header 514, the optional knock out or demister vessel 519, and/or the oxidizer or filter 518 may be combined and flow to an oil/water separator 521.

Figure 6:
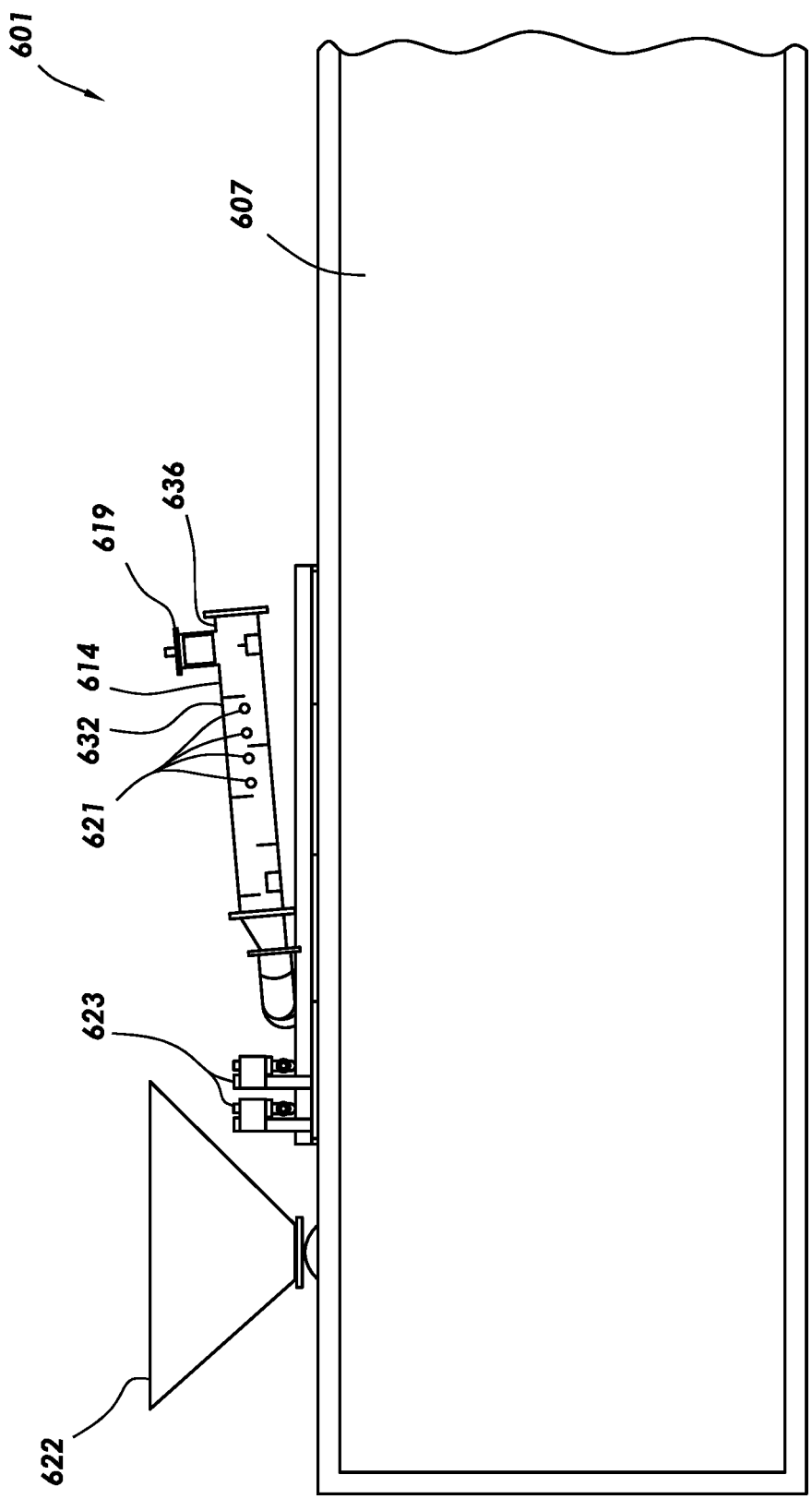
FIG. 6 is a side view of an equipment layout for a thermal desorption system according to certain embodiments of the present disclosure.
Figure 7:
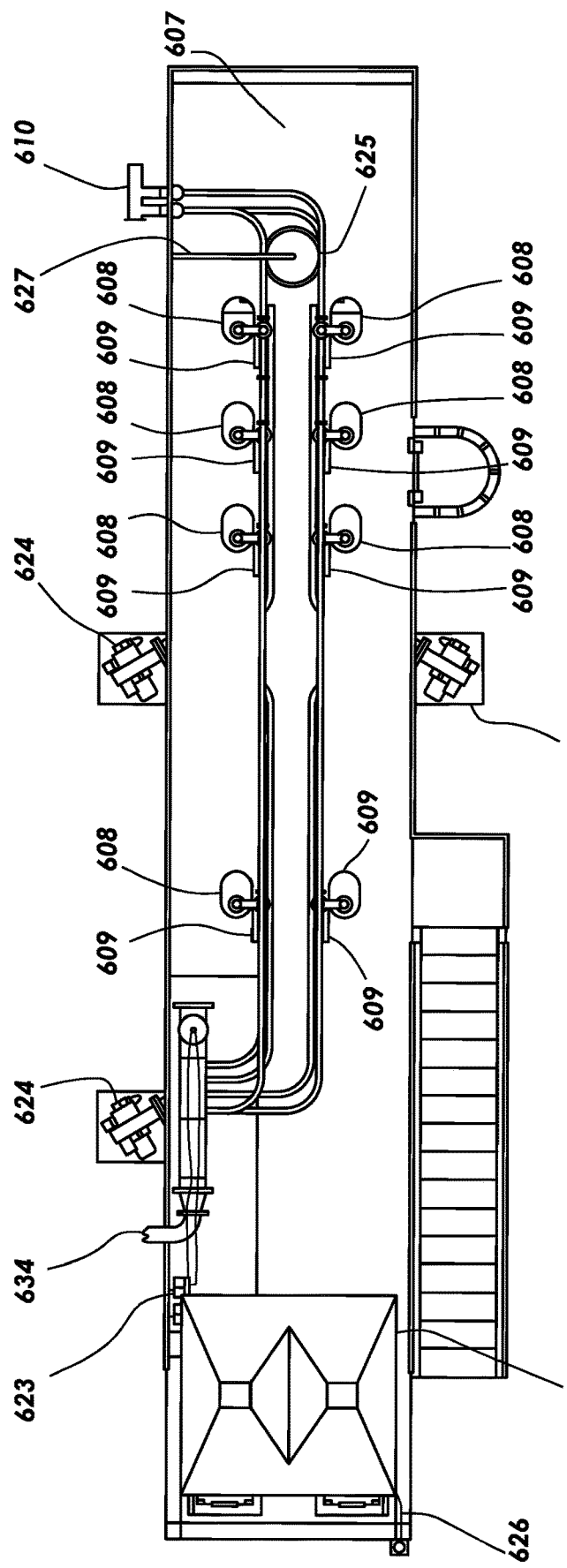
FIG. 7 depicts a top view of an equipment layout for a thermal desorption system according to certain embodiments of the present disclosure.
Figure 8:
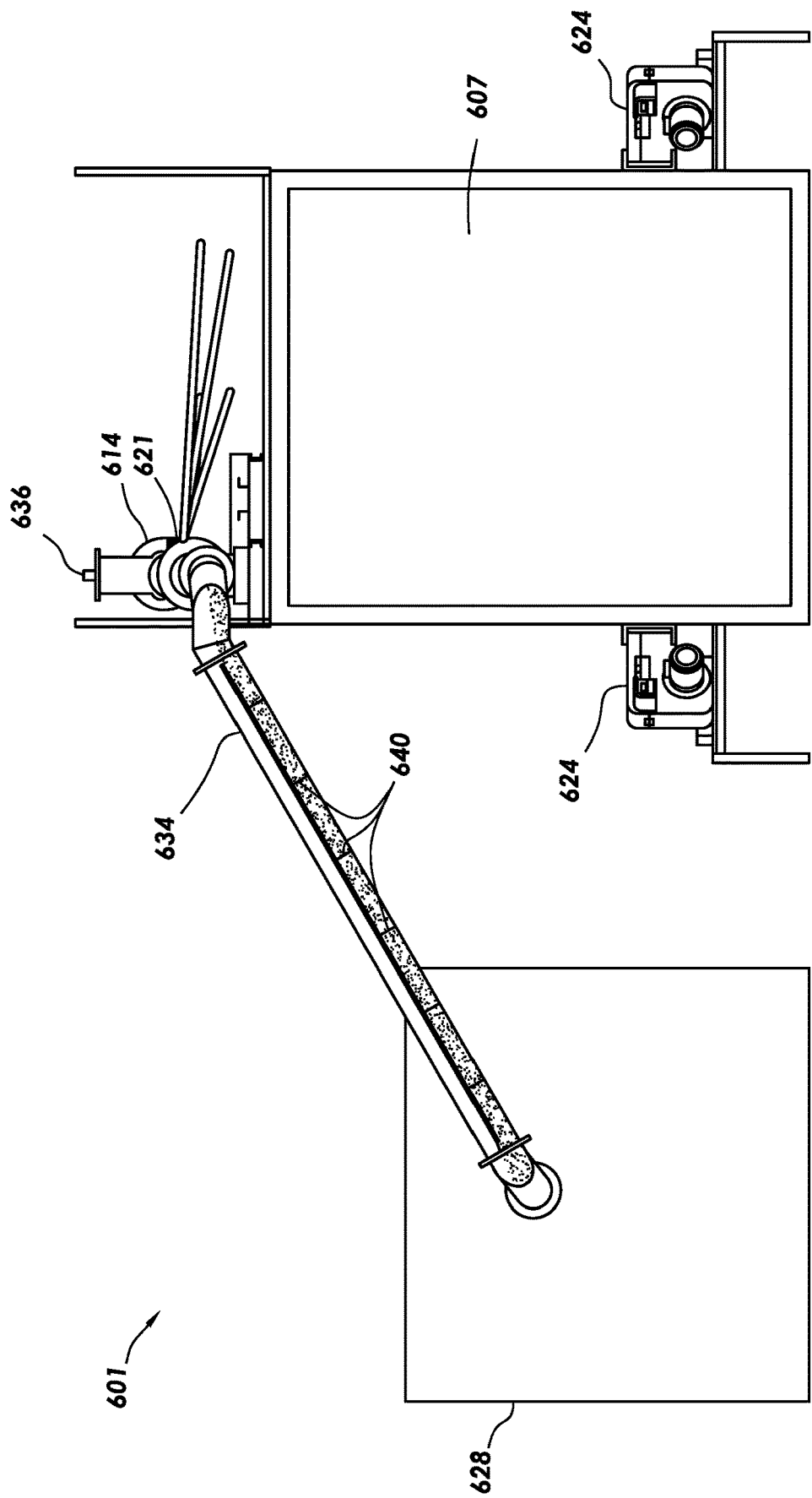
FIG. 8 depicts an equipment layout for a thermal desorption system including a cascading degasser according to certain embodiments of the present disclosure.

FIGS. 6 through 8 depict examples of equipment layouts for certain embodiments of the present disclosure. FIG. 6 depicts a side view of an equipment layout for a thermal desorption system 601 according to certain embodiments of the present disclosure. A condensed vapor and motive fluid header 614 is positioned on top of heating unit 607, which surrounds a desorption vessel (not shown). Header fluid inlets 621 in the substantially horizontal portion 632 of the header 614 are connectable to motive fluid and condensed vapors flowing from one or more eductors connected to vapor outlets of the desorption vessel (not shown). A feed hopper 622 receives the slurry for introduction into the desorption vessel. The non-condensable gases exit the header 614 via the gas outlet 636 and optionally pass through a demister or knock out vessel 619. The non-condensable gases flow to non-condensable gas valves 623 to be further routed or processed (as shown in more detail in FIG. 7).

FIG. 7 depicts a top view of an equipment layout for the thermal desorption system 601 of FIG. 6, according to certain embodiments of the present disclosure. Burners 624 are positioned around the heating unit 607. The vapor outlets 608 from the desorption vessel within the heating unit 607 are connected to eductors 609. Motive fluid flows from a motive fluid feed 610 through the eductors 609. The motive fluid and condensed vapors exiting the eductors 609 flows to the condensed vapor and motive fluid header 614. The liquid in the header 614 flows down the cascading degasser 634 from the header 614 to an oil/water separator (not shown). Gas from the header 614 flows out of the gas outlet to the non-condensable gas valves 623. The gas valves 623 direct the gas either through a first line 626 to the heating unit 607 as fuel for the burners 624 or through a second line 627 for discharge via the stack 625. In some embodiments, the desorption vessel may be modular. For example, in certain embodiments, the vapor outlets 608 and eductors 609 distributed along the length of the vessel may be selectively opened or closed (e.g., with one or more outlet valves) to adjust the configuration and positioning of the active vapor outlets. In certain embodiments, the configuration of the active vapor outlets 608 may be determined based, at least in part, on the composition of the slurry.

FIG. 8 depicts an end view of an equipment layout for the thermal desorption system 601 including a cascading degasser 634. The liquid in the header 614 flows down the cascading degasser 634 from the header 614 to an oil/water separator 628. The cascading degasser 634 includes the inserts 640 shown in FIG. 4.

Figure 9:
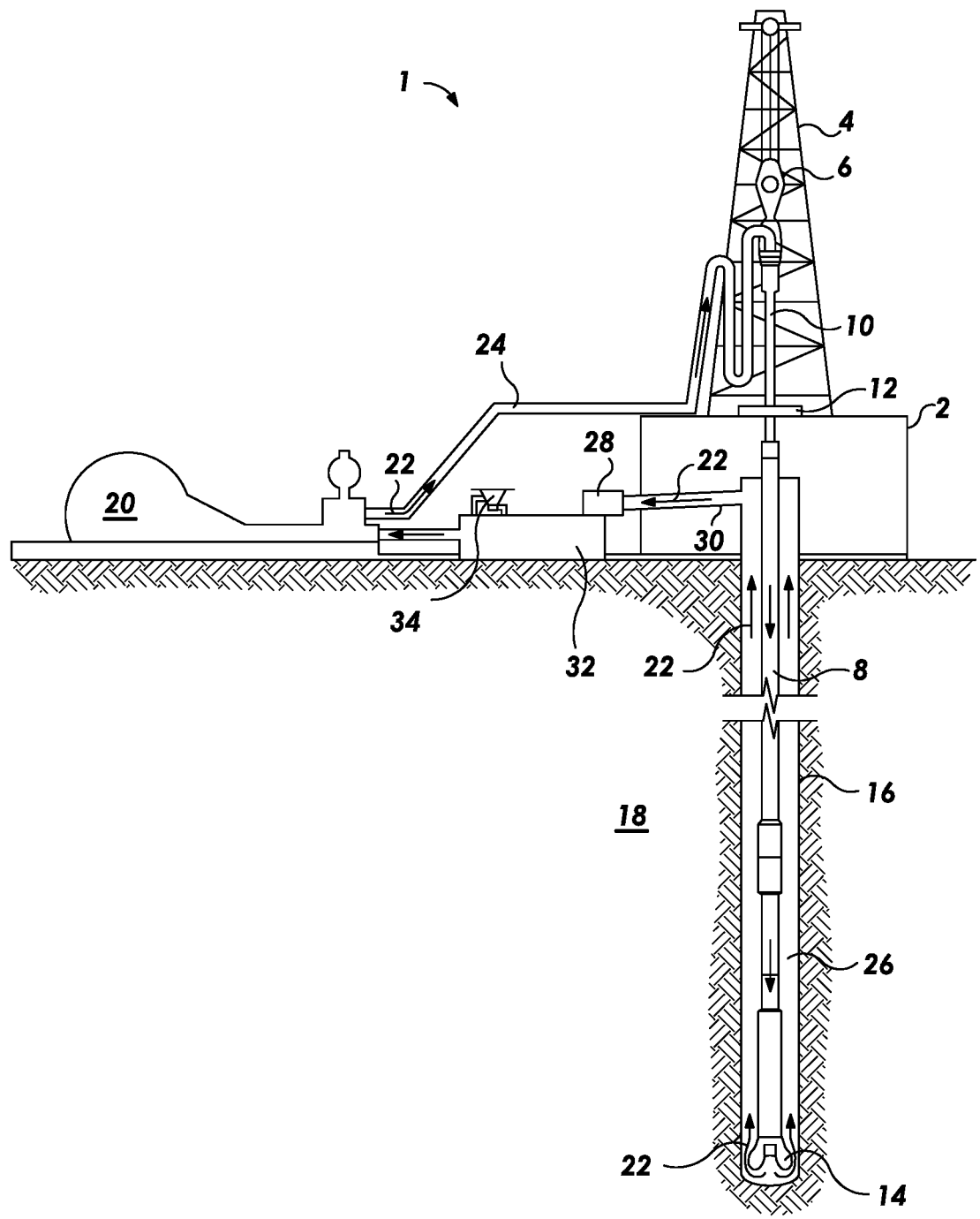
FIG. 9 is a diagram illustrating an example of a wellbore drilling assembly that may be used in accordance with certain embodiments of the present disclosure.

For example, and with reference to FIG. 9, the desorption systems and methods of the present disclosure may be associated with an exemplary wellbore drilling assembly 1, according to one or more embodiments. It should be noted that while FIG. 9 generally depicts a land-based drilling assembly, those skilled in the art will readily recognize that the principles described herein are equally applicable to subsea drilling operations that employ floating or sea-based platforms and rigs, without departing from the scope of the disclosure. In certain embodiments, the methods and systems of the present disclosure may be performed at the same location as the drilling assembly 1 of FIG. 9 or at a different location (e.g., a remote location).

As illustrated, the drilling assembly 1 may include a drilling platform 2 that supports a derrick 4 having a traveling block 6 for raising and lowering a drill string 8.

The drill string 8 may include, but is not limited to, drill pipe and coiled tubing, as generally known to those skilled in the art. A kelly 10 supports the drill string 8 as it is lowered through a rotary table 12. A drill bit 14 is attached to the distal end of the drill string 8 and is driven either by a downhole motor and/or via rotation of the drill string 8 from the well surface. As the bit 14 rotates, it creates a wellbore 16 that penetrates various subterranean formations 18.

A pump 20 (e.g., a mud pump) circulates wellbore fluid 22 (e.g., a drilling fluid) through a feed pipe 24 and to the kelly 10, which conveys the wellbore fluid 22 downhole through the interior of the drill string 8 and through one or more orifices in the drill bit 14 (or optionally through a bypass or ports (not shown) along the drill string and above the drill bit 14). The wellbore fluid 22 is then circulated back to the surface via an annulus 26 defined between the drill string 8 and the walls of the wellbore 16. At the surface, the recirculated or spent wellbore fluid 22 exits the annulus 26 and may be conveyed to one or more fluid processing unit(s) 28 via an interconnecting flow line 30. In certain embodiments, the systems and methods of the present disclosure may receive fluids produced while drilling. For example, the fluid processing unit(s) 28 may include the desorption vessel, heating units, and/or other components of the methods and systems of the present disclosure, as described herein. In addition, the fluid processing unit(s) 28 which may also include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and any additional fluid reclamation equipment. The fluid processing unit(s) 28 may further include one or more sensors, gauges, pumps, compressors, and the like. After passing through the fluid processing unit(s) 28, a "cleaned" wellbore fluid 22 is deposited into a nearby retention pit 32 (e.g., a mud pit). While illustrated as being arranged at the outlet of the wellbore 16 via the annulus 26, those skilled in the art will readily appreciate that the fluid processing unit(s) 28 may be arranged at any other location in the drilling assembly 1 to facilitate its proper function, without departing from the scope of the scope of the disclosure. Additives may be added to the wellbore fluid 22 via a mixing hopper 34 communicably coupled to or otherwise in fluid communication with the retention pit 32. The mixing hopper 34 may include, but is not limited to, mixers and related mixing equipment known to those skilled in the art. In other embodiments, however, additives may be added to the wellbore fluid 22 at any other location in the drilling assembly 1. In at least one embodiment, for example, there could be more than one retention pit 32, such as multiple retention pits 32 in series.

An embodiment of the present disclosure is a system including a desorption vessel including an inner chamber; a heating unit disposed adjacent to the desorption vessel configured to heat a slurry including solids and oil disposed in the inner chamber of the desorption vessel; and a plurality of vapor outlets in fluid communication with the inner chamber of the desorption vessel, wherein each vapor outlet is in fluid communication with a condenser or an eductor for condensing vapors generated by heating the slurry.

In one or more embodiments described above, the desorption vessel includes a conveyor capable of feeding the slurry through the desorption vessel. In one or more embodiments described above, the slurry includes solids, oil, and water. In one or more embodiments described above, the desorption vessel is configured to operate at a negative pressure. In one or more embodiments described above, the plurality of vapor outlets are spaced apart along a length of the desorption vessel. In one or more embodiments described above, one or more of the plurality of vapor outlets may be opened or closed by one or more outlet valves. In one or more embodiments described above, the system further includes a cascading degasser unit including a degassing insert in fluid communication with the condensed vapors from the condensers or eductors.

Another embodiment of the present disclosure is a method including heating a slurry including oil and solids in a desorption vessel to convert at least a portion of the oil in the slurry to oil vapor; removing at least a first portion of the oil vapor from the desorption vessel at a first oil vapor outlet; and removing at least a second portion of the oil vapor from the desorption vessel at a second oil vapor outlet.

In one or more embodiments described above, the method further includes condensing at least some of the first portion of the oil vapor. In one or more embodiments described above, the method further includes condensing at least some of the first portion of the oil vapor in a first eductor in fluid communication with the first oil vapor outlet. In one or more embodiments described above, the method further includes selecting the position of at least one of the first oil vapor outlet and the second oil vapor outlet based, at least in part, on the composition of the slurry. In one or more embodiments described above, the method further includes opening or closing one or more vapor outlets using one or more outlet valves based, at least in part, on the selection of the position of the first oil vapor outlet and the second vapor outlet. In one or more embodiments described above, the slurry includes an aqueous fluid and the method further includes allowing at least a portion of the aqueous fluid to convert to aqueous vapor in response to the heating. In one or more embodiments described above, the method further includes removing the first portion and second portion of the oil vapor includes applying a negative pressure to the desorption vessel using one or more eductors.

Another embodiment of the present disclosure is a system including a desorption vessel including an inner chamber; a heating unit surrounding the desorption vessel and configured to heat a slurry including solids and oil disposed in the inner chamber of the desorption vessel; a plurality of vapor outlets in fluid communication with the inner chamber of the desorption vessel; and a plurality of eductors configured to condense vapors from the plurality of vapor outlets, wherein each vapor outlet is coupled to an eductor.

In one or more embodiments described above, the desorption vessel includes a conveyor capable of feeding the slurry through the desorption vessel. In one or more embodiments described above, the slurry includes solids, oil, and water. In one or more embodiments described above, the desorption vessel is configured to operate at a negative pressure generated by the plurality of eductors. In one or more embodiments described above, the plurality of vapor outlets are spaced apart along a length of the desorption vessel. In one or more embodiments described above, one or more of the plurality of vapor outlets may be selectively opened or closed by one or more outlet valves.

To facilitate a better understanding of the present disclosure, the following examples of certain aspects of certain embodiments are given. The following examples are not the only examples that could be given according to the present disclosure and are not intended to limit the scope of the disclosure or claims.

EXAMPLES

Example 1

In this example, a sample calculation was performed to compare the energy required to desorb an oily slurry in a system where vapors are comingled prior to condensation to the energy required to desorb the same oily slurry in a system that does not include comingling of vapors prior to condensation (e.g., the system of FIG. 1 or 3). An example drill cutting slurry was used for these calculations including oil, water, and drill cuttings in a ratio of 15%/10%/75% Oil/Water/Solids content by weight. The total energy required for the desorption of the slurry was calculated by summing (i) the energy required to heat and volatilize the hydrocarbons, (ii) the energy required to heat and volatize the water, and (iii) the energy required to heat the solids. These calculations are shown in Tables 1 and 2 below, with the energy requirements based on known specific heats and heats or vaporization.

TABLE 1

Energy Required for Desorption of
Oily Slurry with Vapor Comingling

|  | W h/kg | W h/kg |
|---|---|---|
| Energy to heat and volatilize hydrocarbons | | |
| Energy to heat liquid hydrocarbons from 25° C. to 300° C. | 22 | |
| Energy to heat hydrocarbon liquid to vapor at 300° C. | 11 | |
| Total | 33 | |
| Energy to heat and volatilize water with comingled vapors | | |
| Energy to heat water from 25° C. to 100° C. | 9 | |
| Energy to heat water to steam at 100° C. | 62 | |
| Energy to heat water to steam from 100° C. to 300° C. | 10 | |
| Total | 81 | |
| Energy to heat solids | 45 | |
| Total Energy for the desorption of slurry | | 159 |

TABLE 2

Energy Required for Desorption of Oily
Slurry without Vapor Comingling

|  | W h/kg | W h/kg |
|---|---|---|
| Energy to heat and volatilize hydrocarbons | | |
| Energy to heat liquid hydrocarbons from 25° C. to 300° C. | 22 | |
| Energy to heat liquid to vapor hydrocarbons at 300° C. | 11 | |
| Total | 33 | |
| Energy to heat and volatilize water | | |
| Energy to heat water from 25° C. to 100° C. | 9 | |
| Energy to heat water to steam at 100° C. | 62 | |
| Energy to heat water to steam from 100° C. to 300° C. | 0 | |
| Total | 71 | |
| Total Energy to heat solids | 45 | |
| Total Energy for the desorption of slurry | | 149 |

As shown in Tables 1 and 2, the specific energy required to desorb the slurry is 159 Watt-hour per kilogram (W h/kg) for a desorption system that comingles the vapors and 149 W h/kg for a desorption system that does not comingle the vapors. This shows that when the vapors are extracted without comingling (e.g., no superheating of the steam), the specific energy required to desorb an oily slurry is reduced by 6% as compared with a method and system in which the vapors comingle prior to condensation.

Example 2

Figure 10C:
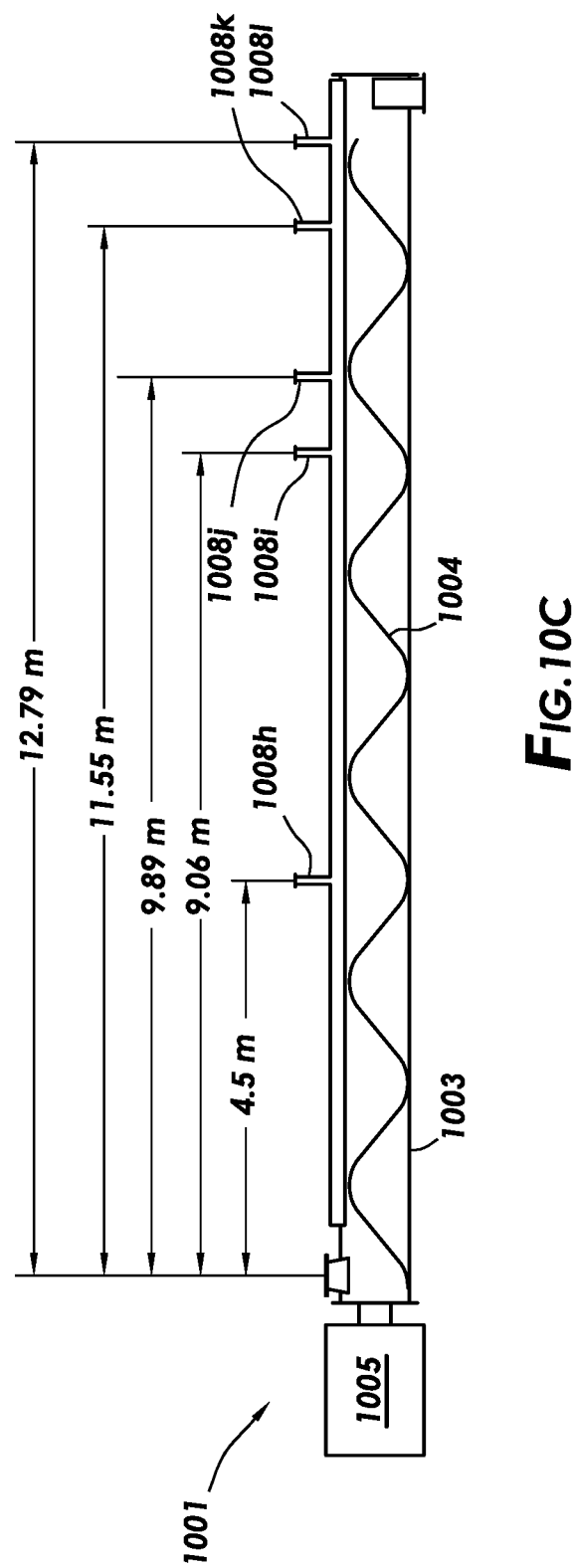

In this example, methods are presented for calculating energy efficient positions for vapor outlets for a desorption system that does not include vapor comingling (e.g., a desorption system similar to FIGS. 1 and 3). The desorption vessel and the calculated vapor outlets for this example are depicted in FIGS. 10A-C, which depict a 13 meter (m) desorption vessel 1003 including vapor outlets 1008a-l with a drive 1005 for a conveying system 1004. The same example slurry that was used in Example 1 was used in this example. As listed in Table 2 above, the energy required to desorb the liquid compounds for that 15%/10%/75% oil/water/solids slurry is calculated as 33 W-h/kg for the hydrocarbons and 71 W-h/kg for the water. This means that 68% of the energy required for desorption is used to volatize the water and 32% is used to volatize the hydrocarbons. The 13 m length of the desorption vessel 1040 was divided into a water desorption zone 1041 that covers about 68% of the length of the vessel (8.86 m) and a hydrocarbon desorption zone 1042 that covers the remaining length of the vessel (4.14 m).

In the example shown in FIG. 10A, the first vapor outlet was selected to be in the water desorption zone 1041, which is the first 8.86 m of the length of the desorption vessel 1003. The midpoint between 0 and 8.86 m was selected for the first vapor outlet to minimize the distance the water vapors travel prior to removal. This is shown as the first vapor outlet 1008a in FIG. 10A. In the example in FIG. 10A, the second vapor outlet 1008b was placed at the midpoint of the hydrocarbon desorption zone 1041, or 2.07 m from the end of the desorption vessel 1003.

Table 3 below shows the results of example calculations of the vapor outlets using two other methods, an equal hydrocarbon separation method and a weighted hydrocarbon method. The same slurry from Example 1 was used for each of these, and the water desorption zone and first vapor outlet is the same. The difference in these methods concerns the placement of the vapor outlets in the hydrocarbon desorption zone. These examples assume that the oil phase of the liquid in the slurry includes four hydrocarbons HC-1 through HC-4 with different boiling points, hydrocarbons being numbered in order of increasing boiling points.

Using the equal hydrocarbon separation method, the vapor outlets may be determined by subdividing the hydrocarbon desorption zone 1042 into four equal hydrocarbon zones (each 1.04 m in length), and positioning the vapor outlets at the midpoint of each of those zones. Vapor outlets selected using this method are depicted in FIG. 10B and listed below in Table 3. The hydrocarbon desorption zone was subdivided into four equal hydrocarbon zones 1.04 m in length, and vapor outlets 1008c-g were then positioned at the midpoint of each subdivided desorption zone to arrive at the vapor outlets 1008c-g shown in FIG. 10B and listed below in Table 3.

Using the weighted hydrocarbon method, the vapor outlets may be determined by subdividing the hydrocarbon desorption zone 1042 according to a weighted distribution of hydrocarbons HC-1 through HC-4. The example vapor outlets prepared using this method were determined for a weighted distribution of hydrocarbons HC-1 through HC-4 that have a weight distribution of 10%, 30%, 50%, and 10%, respectively. Vapor outlets selected using this method are depicted in FIG. 10C and listed below in Table 3. The hydrocarbon desorption zone was subdivided according to the weight distribution of the hydrocarbons. For example, 10% (0.41 m) of the hydrocarbon zone was designated as the desorption zone for HC-1, 30% (1.24 m) of the hydrocarbon zone was designated as the desorption zone for HC-2, etc. Vapor outlets 1008h-l were then positioned at the midpoint of each subdivided desorption zone to arrive at the vapor outlets 1008h-l shown in FIG. 10C and listed below in Table 3.

TABLE 3

Example Calculation of Vapor Outlet Position

Vapor Outlet Positioning

| | |
|---|---|
| Desorption Vessel length | 13.00 m |
| Water Desorption Zone length from front | 8.86 m |
| Zone 1: Vapor Outlet 1 distance from front | 4.43 m |
| Hydrocarbon Desorption Zone length | 4.14 m |

Equal Hydrocarbon Separation Method

| | |
|---|---|
| Vapor Outlet Spacing | 1.04 m |
| Zone 2: Vapor Outlet 2 distance from front | 9.38 m |
| Zone 2: Vapor Outlet 3 distance from front | 10.41 m |
| Zone 2: Vapor Outlet 4 distance from front | 11.45 m |
| Zone 2: Vapor Outlet 5 distance from front | 12.48 m |

Weighted Hydrocarbon Method

| | |
|---|---|
| HC-1 | 10% m |
| HC-2 | 30% m |
| HC-3 | 50% m |
| HC-4 | 10% m |
| Zone 2: Vapor Outlet 2 distance from front | 9.06 m |
| Zone 2: Vapor Outlet 3 distance from front | 9.89 m |
| Zone 2: Vapor Outlet 4 distance from front | 11.55 m |
| Zone 2: Vapor Outlet 5 distance from front | 12.79 m |

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A system comprising:
a desorption vessel comprising an inner chamber;
a heater disposed configured to heat a slurry comprising solids and oil disposed in the inner chamber of the desorption vessel; and
a plurality of vapor outlets in fluid communication with the inner chamber of the desorption vessel, wherein each of the vapor outlets is in fluid communication with a corresponding one of a plurality of eductors for condensing vapors generated by heating the slurry,
wherein each of the eductors fully condenses vapors received through the corresponding one of the vapor outlets; and
a flow path coupled to outlets of each of the plurality of eductors, wherein the flow path combines the vapors from each of the plurality of eductors after the vapors are fully condensed.

2. The system of claim 1, wherein the desorption vessel comprises a conveyor capable of feeding the slurry through the desorption vessel.

3. The system of claim 1, wherein the slurry comprises solids, oil, and water.

4. The system of claim 1, wherein the desorption vessel is configured to operate at a negative pressure.

5. The system of claim 1, wherein the plurality of vapor outlets are spaced apart along a length of the desorption vessel.

6. The system of claim 1, wherein one or more of the plurality of vapor outlets may be selectively switched between open to flow toward the corresponding eductor through the vapor outlet and closed to flow toward the corresponding eductor through the vapor outlet by one or more outlet valves.

7. The system of claim 1, further comprising a motive fluid header coupled to each of the eductors, wherein the motive fluid header passes motive fluid therefrom to each of the eductors, wherein the motive fluid applies a negative pressure to each of the vapor outlets.

8. A system comprising:
a desorption vessel comprising an inner chamber;
a heater configured to heat a slurry comprising solids and oil disposed in the inner chamber of the desorption vessel;
a plurality of vapor outlets in fluid communication with the inner chamber of the desorption vessel; and
a plurality of eductors configured to condense vapors from the plurality of vapor outlets, wherein each vapor outlet is in fluid communication with one of the plurality of eductors,
wherein each of the eductors fully condenses vapors received through the corresponding one of the vapor outlets;
one or more cyclones configured to remove particles from the vapors, wherein each of the one or more cyclones is connected to one of the plurality of vapor outlets; and
a flow path coupled to outlets of each of the plurality of eductors, wherein the flow path combines the vapors from each of the plurality of eductors after the vapors are fully condensed.

9. The system of claim 8, wherein the desorption vessel comprises a conveyor capable of feeding the slurry through the desorption vessel.

10. The system of claim 8, wherein the slurry comprises solids, oil, and water.

11. The system of claim 8, wherein the desorption vessel is configured to operate at a negative pressure generated by the plurality of eductors.

12. The system of claim 8, wherein the plurality of vapor outlets are spaced apart along a length of the desorption vessel.

13. The system of claim 8, wherein one or more of the plurality of vapor outlets may be selectively opened or closed to flow toward the corresponding eductor through the vapor outlet by one or more outlet valves.

14. The system of claim 8, further comprising a motive fluid header coupled to each of the eductors, wherein the motive fluid header passes motive fluid therefrom to each of the eductors, wherein the motive fluid applies a negative pressure to each of the vapor outlets.

15. A method comprising:
    heating, via a heater, a slurry comprising oil and solids disposed in an inner chamber of a desorption vessel to convert at least a portion of the oil in the slurry to oil vapor;
    removing at least a first portion of the oil vapor from the desorption vessel at a first oil vapor outlet in fluid communication with the inner chamber of the desorption vessel;
    fully condensing the first portion of the oil vapor via a first eductor in fluid communication with the first oil vapor outlet;
    removing at least a second portion of the oil vapor from the desorption vessel at a second oil vapor outlet in fluid communication with the inner chamber of the desorption vessel;
    fully condensing the second portion of the oil vapor via a second eductor in fluid communication with the second oil vapor outlet;
    discharging the first portion of the oil vapor and the second portion of the oil vapor through a flow path coupled to an outlet of each of the first eductor and the second eductor, wherein the flow path combines the first portion of the oil vapor and the second portion of the oil vapor after the first portion of the oil vapor and the second portion of the oil vapor are fully condensed.

16. The method of claim 15, further comprising selecting a position of at least one of the first oil vapor outlet and the second oil vapor outlet based, at least in part, on a composition of the slurry.

17. The method of claim 16, further comprising opening or closing one or more of the vapor outlets using one or more outlet valves based, at least in part, on the selection of the position of the first oil vapor outlet and the second vapor outlet.

18. The method of claim 15, wherein the slurry further comprises an aqueous fluid and the method further comprises allowing at least a portion of the aqueous fluid to convert to aqueous vapor in response to the heating.

19. The method of claim 15, wherein removing the first portion and second portion of the oil vapor comprises applying a negative pressure to the desorption vessel using the first eductor and the second eductor.

\* \* \* \* \*